United States Patent Office 2,803,993
Patented Aug. 27, 1957

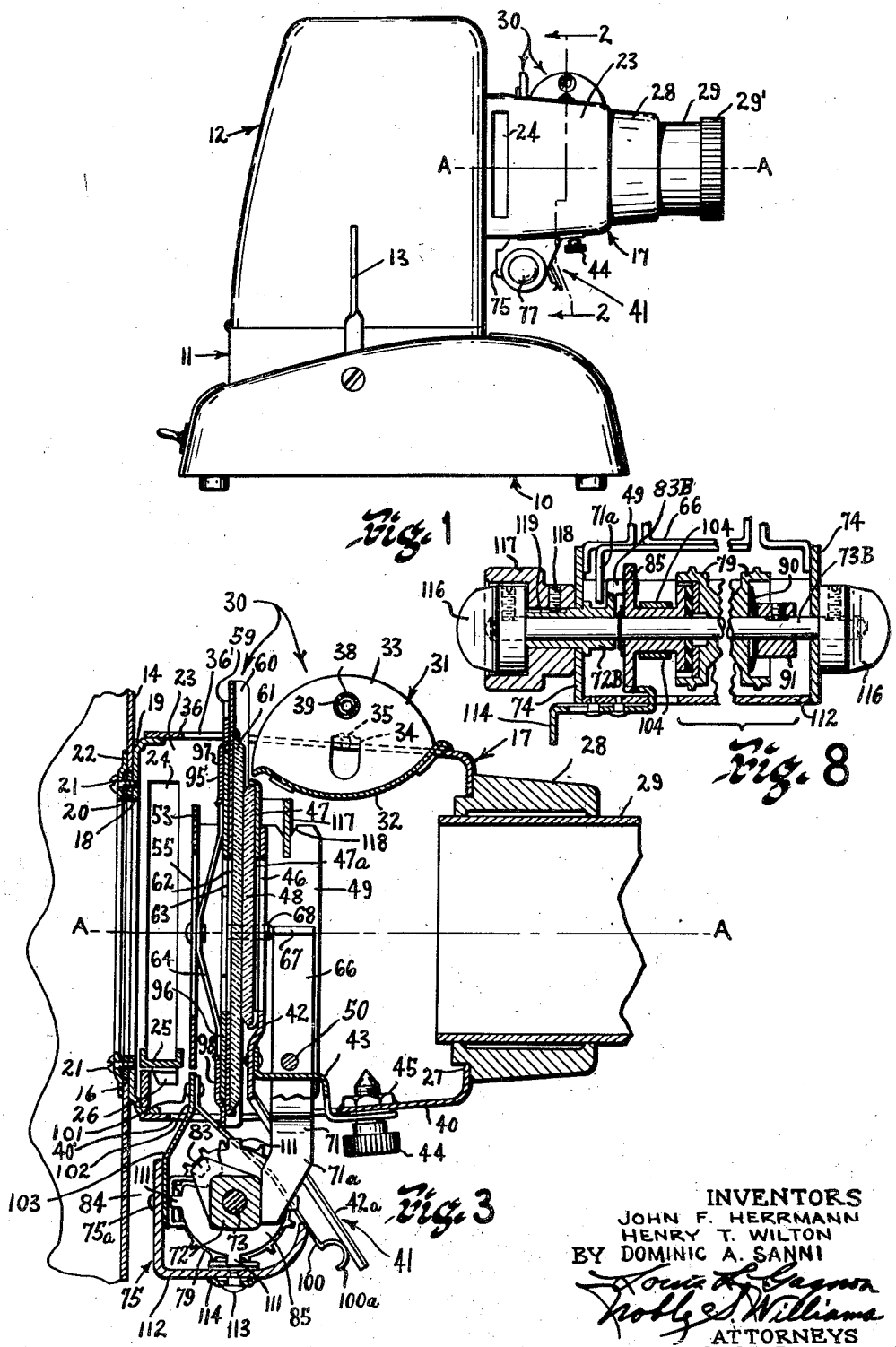

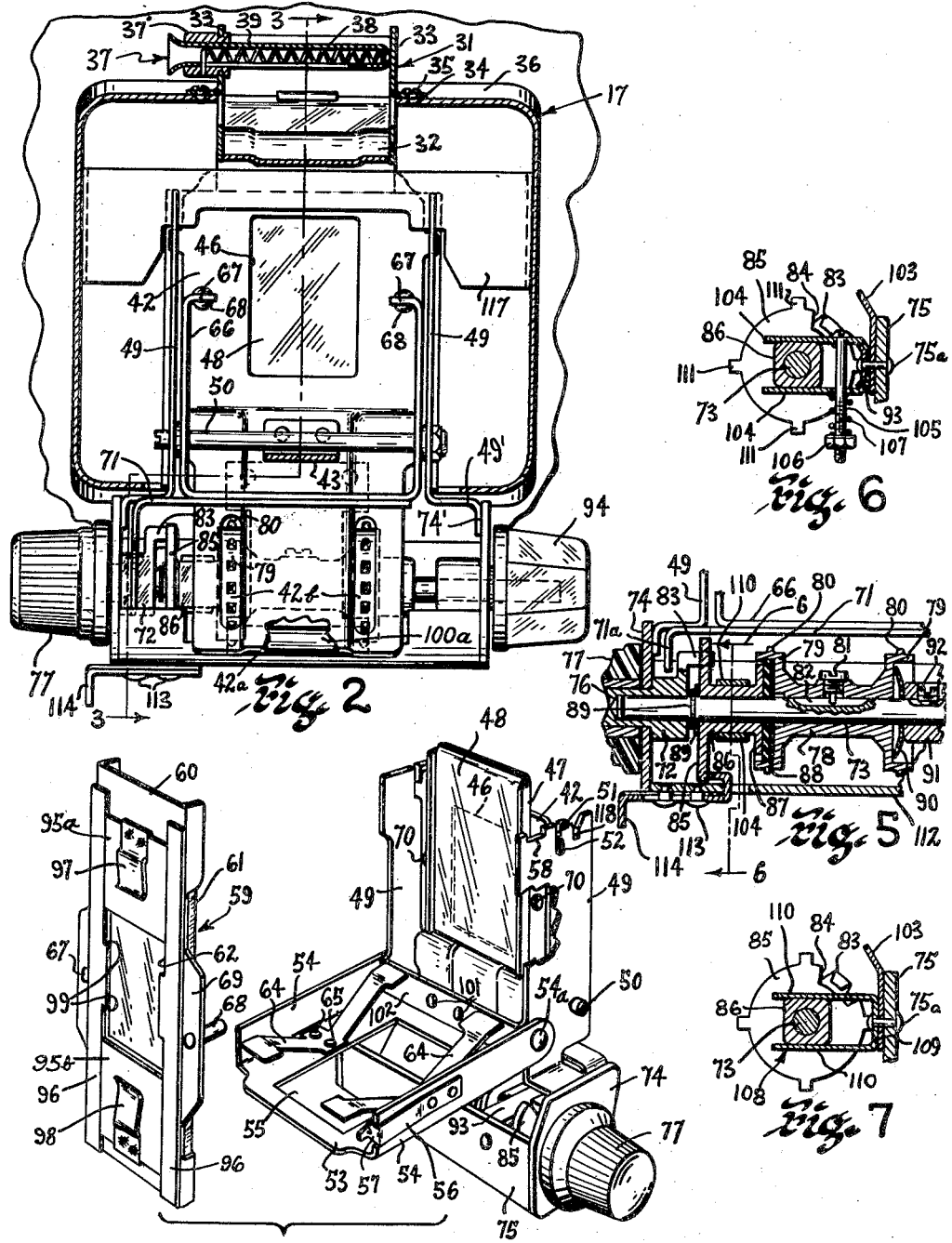

2,803,993

PROJECTION APPARATUS

John F. Herrmann, Lynnfield, Mass., Henry T. Wilton, Buffalo, N. Y., and Dominic A. Sanni, Boston, Mass., assignors to American Optical Company, Southbridge, Mass., a voluntary association of Massachusetts Application September 21, 1953, Serial No. 381,281

7 Claims. (Cl. 88—28)

This invention relates to improvements in still projection apparatus and similar instruments, and more particularly has reference to strip film handling apparatus arranged to be used with either strip film projectors, or combined slide and strip film projectors, or the like. The improved film handling apparatus of the present invention has novel film framing, locating and advancing means for moving and positioning strip film transparencies relative to a projection aperture of the associated instrument.

One of the principal objects of the present invention is to provide projection apparatus having means for the selective projection of transparent slides or strip film, as desired, and which means comprising a removable film handling unit embodying a pair of transparent pressure plates for gripping opposite surfaces of individual picture areas of strip film and accurately locating same at a focal plane of the projector during projection thereof, and means for opening said plates and controlling the advancement of said strip film to locate successive picture areas thereof in accurate position lengthwise of the film and relative to the associated projection aperture; said unit being so constructed and arranged as to permit it to be readily bodily removed from the projector for cleaning and adjustment purposes or when individual slides are to be projected.

Another object of the invention is to provide in such strip film handling apparatus framing and locating means of the above character embodying a pair of pressure plates at least one of which is relatively movable, said pressure plates being constructed and arranged to resiliently engage the opposed (front and back) surfaces of the strip film positioned at the projection aperture of the projector for projection purposes, said movable pressure plate being arranged to be positively released from pressing engagement with said film when the film is to be advanced and prior to any actual movement of the film, and being arranged to thereafter engage the said film only after the film has ceased its advance movement.

Another object of the invention is to provide projection apparatus of the above character wherein a removable strip film handling unit thereof embodies adjustable means operable when the unit is removed from the apparatus for varying the size of projection aperture being provided said apparatus.

Another object of the invention is to provide strip film handling apparatus having framing and locating means comprising a pair of pressure plates adapted to cooperatively resiliently engage opposed surfaces of strip film being used in the apparatus, and spring means for yieldably urging at least one of said plates into firm engagement with said strip film, said spring means being carried by supporting means hingedly attached to a part of the unit for positionment in spaced relation to said pressure plates when one of said pressure plates is to be positioned in or removed from the unit or the unit is to be cleaned or adjusted for aperture size.

A further object is to provide in projection apparatus of the above type improved means for advancing strip film and for accurately locating successive image areas thereof to be projected with respect to a projection aperture of the apparatus, said advancing and locating means embodying a pair of pressure plates, gate opening means for actuating one of said plates, adjustable projection aperture defining means, and readily adjustable rotatable means for cooperating therewith when apertures of different sizes in accordance with the size of the individual picture areas appearing upon the strip film are to be used.

A still further object is to provide improved projection apparatus of the above character having strip film handling means wherein a first unit thereof embodying the framing and locating means for advancing and positioning the strip film and the gate opening means therefor is readily removable and insertable in said apparatus and wherein a second unit thereof embodying a film-receiving magazine and film retaining means is formed as a separate part carried on a fixed part of the housing of the apparatus and arranged to function cooperatively with said first unit during use of the apparatus.

Other objects and advantages of the invention will become apparent from the following description when taken in conjunction with the accompanying drawings, in which:

Fig. 1 is a side elevational view of combined slide and strip film projection apparatus embodying the invention;

Fig. 2 is an enlarged fragmentary vertical sectional view taken substantially on line 2—2 of Fig. 1 and looking in the direction of the arrows;

Fig. 3 is a fragmentary vertical sectional view taken substantially on line 3—3 of Fig. 2 and looking in the direction of the arrows;

Fig. 4 is an exploded perspective view of the strip film framing means and pressure plate means formed in accordance with the invention;

Fig. 5 is a fragmentary vertical sectional view taken substantially through the center of the manually operable means for effecting advance and framing of strip film;

Fig. 6 is a fragmentary sectional view taken substantially on line 6—6 of Fig. 5 and looking in the direction of the arrows;

Fig. 7 is a view generally similar to Fig. 6 but showing a modified construction; and Fig. 8 is a view generally similar to Fig. 5 but illustrating a modification in the means for advancing and framing strip film.

Projection devices heretofore have embodied various means and methods for framing strip film between transparent pressure plates during projection and for advancing the film to successively locate image areas of the film in position for projection. However, such a device generally has not been readily and conveniently adaptable for projection of both slide and strip film transparencies. The projection device of the present invention, however, overcomes such objections of the prior art by providing at a first axial location means for accommodating a conventional slide carrier and at a closely adjacent axial location strip film handling apparatus. This film handling apparatus in turn comprises a first fixed unit and a second single or self-contained removable unit. The latter embodies pressure plates for framing and locating picture areas of strip film transparencies in a predetermined focal plane during projection and further embodies means for effecting and controlling the advancement of said strip film transparencies to position individual image areas thereof in accurate position for projection, said removable unit being so constructed and arranged as to permit thorough cleaning of the various parts thereof separated or detached when the unit is removed from the projector and still further embodying adjustable gates or slides which can be located in desired positions when the unit is removed from the projector for controlling the size of the projection aperture.

Referring more particularly to the drawings, wherein like characters of reference designate like parts throughout the several figures thereof, a projection device or instrument embodying a preferred form of the invention is disclosed in Fig. 1. The device comprises a hollow base 10 on which is mounted a supporting member 11 having a housing 12 hingedly secured to the upper side thereof. The supporting member 11 is pivotally connected to the base 10 by means (not shown) whereby the housing 12 may be tilted forwardly or rearwardly in response to manual operation of a handle 13 for changing the projection axis of the device. The housing 12 encloses various conventional projection elements such as a source of illumination, cooling baffles, condenser lens system, heat screens and the like, and a conventional cooling fan may be housed within the base 10.

A frontal wall 14 of the housing 12 has an aperture 16 formed therein (Fig. 3) over which is positioned an auxiliary housing 17. The aperture 16 is circular in shape and communicates with the interior of the auxiliary housing 17 through a substantially concentric aperture 18 formed in a rear wall 19 of the auxiliary housing 17. The auxiliary housing 17 is rotatably attached to the front wall 14 by means of a circular ring-like member 20 which is arranged to be slidably received within the aperture 16 in wall 14 and which ring-like member is connected to the rear wall 19 of auxiliary housing 17 by screws 21, or the like, extending through an annular spring-like member 22 of larger outside diameter. The member 22 frictionally engages the inner surface of the front wall 14 throughout its outer periphery and thus, the auxiliary housing 17 can be rotated upon application of manual force thereto with the inherent resiliency of the spring-like member 22 acting to frictionally retain the auxiliary housing 17 in any desired adjusted position.

Side walls 23 of the auxiliary housing 17 are provided with elongated rectangular openings 24 for receiving a slide carrier for transparencies which are to be projected in a conventional manner. Aligned with the lower edges of openings 24 is a laterally extending channel shaped track 25 (Fig. 3) for slidably supporting the slide carrier. The track 25 is fixedly attached to brackets 26 carried on the inner sides of the walls 23.

Line A—A in Figs. 1 and 3 represents the optical or projection axis of the projector. Fixedly secured to a front wall 27 of the auxiliary housing 27 is an adaptor 28 which is provided with cylindrical aperture concentric with this axis for slidably receiving an objective lens barrel 29. Mounted in the lens barrel are suitable projection lenses (not shown) which may be of any conventional type suitable for projecting an image of the slide transparencies used with the device onto an image receiving screen in spaced relation thereto. The lens barrel 29 is preferably provided with a circumferential knurled portion 29' and a spiral focusing means (not shown) whereby the operator of the device can easily make the desired adjustments for properly focusing the pictures on slides at a first focal plane transversely aligned with openings 24 on the image receiving screen.

The structure of the present invention is also constructed and arranged to position strip film at a second focal plane closely adjacent the first so that slight adjustment of the objective 29 will focus at either location and, therefore, film handling means 30 is provided with means for receiving strip film and for advancing same through the projector. The film handling means 30 comprises a fixed or stationary magazine 31 (Figs. 2 and 3) for receiving a coil of strip film and this magazine embodies a curved central shelf portion 32 and a pair of upwardly extending end walls 33 attached thereto. The magazine 31 has a pair of ears 34 struck outwardly from the end walls 33 so that the magazine 31 may be secured to a top wall portion 36 of the auxiliary housing 17 by screws 35 or the like. One end wall 33 of the magazine 31 carries a coiled film retainer 37 in the form of a fixed support 37 which has extending therethrough a spring actuated hollow plunger 38. The plunger 38 may be withdrawn from the opposite side of the magazine 31 against the biasing action of a coil spring 39 located within the plunger 38, whereupon a roll of strip film (not shown) may be slipped into place in the recess of the magazine. When the plunger 38 is released and allowed to return to its normal position it will extend through the open center of the coiled strip film and the film will be releasably held in the magazine 31. Alternatively, a fixed retainer extending only partially across the recess from one side wall 33 could be used, if desired, for retaining the coiled portion of the film in the recess of the magazine.

The top wall 36 of the auxiliary housing 17 is provided with a large aperture 36' for accommodating the fixed magazine 31 and through which a free end of the coiled film may extend into the interior of the auxiliary housing 17. A bottom wall 40 of the auxiliary housing 17 is also provided with an opening 40' through which may be inserted and extended a removable unit 41 embodying strip film framing and advancing means. This means comprises an upwardly extending front apertured plate 42 (Figs. 2, 3 and 4) having one end of a forwardly extending attaching bracket 43 riveted or otherwise secured thereto. The other end of the bracket 43 is apertured to receive a locking screw 44 which is adapted to threadedly engage a nut 45 or equivalent means carried by the lower wall portion 40 of the auxiliary housing 17. This arrangement provides convenient means for releasably attaching the removable unit 41 in predetermined position in the auxiliary housing 17. The auxiliary housing 17 also carries a transversely extending retainer member 117 fixedly secured to side walls 23 and this member 117 is adapted to engage within notches 118 provided in the upper ends of a pair of vertically extending side plates 49 of the removable unit. Thus, the upper end of the removable unit 41 is firmly but releasably retained in a predetermined location within the auxiliary housing and the unit is held within the housing by the locking screw 44.

The front plate 42 is provided with an aperture 46 which, in the assembled structure, is in substantial alignment with the optical axis A—A. Attached to the rear side of the plate 42 is a frame 47 which is provided with an aperture 47a. This frame carries a pressure plate 48 formed of transparent material such as glass or plastic and has flanged edges for protecting the edges of the plate 48 from injury. The vertically extending side plates 49, as shown by Figs. 2 and 4, are interconnected near their lower ends by a horizontally extending shaft 50 clamped thereto and at their upper ends by notches 51 adapted to receive ears 52 extending outwardly from the respective upper side edges of the apertured plate 42 and which may be bent over after assembly of the parts. A hinge plate or gate 53 is provided with angularly extending vertically disposed side portions 54 which overlie and are hingedly connected to the respective side plates 49 near their lower ends as by pins 54a.

Thus, the hinge plate or gate 53 is adapted to be swung downwardly from its normally closed position to an open position or, conversely, swung upwardly into a closed position in substantially parallel spaced relation with the front plate 42 as the case may be. The hinge plate 53 is provided with an aperture 55 therein which is of a size substantially the same as or slightly larger than the aperture 46 in the front plate 42 with which it is normally aligned. One of the side portions 54 of the hinge plate 53 carries an elongated leaf spring 56 thereon, this spring being provided at its upper end with an inwardly angled catch portion 57 which is adapted to engage a notch 58 in the upper end of the adjacent side plate 49.

A second similar catch on the opposite side of the gate could be provided if desired. Thus, the hinge plate 53 may be normally retained in closed position in spaced parallel relation with the front plate 42.

A pressure plate assembly 59 is adapted to be inserted between the hinge plate 53 and the transparent pressure plate 48 carried by the front plate 42. The pressure plate assembly 59 comprises an apertured frame member 60 and this frame member 60 carries a transparent pressure plate 61 at its forward side which is similar to the transparent pressure plate 48. The frame 60 is provided with a "double size" aperture 62 which is substantially aligned with aperture 46 in front plate 42. Thus, when double size pictures are to be projected light will be permitted to pass through the apertures 62, 47a and 46. Means for providing single size pictures is also provided and will be described in detail hereinafter.

A pair of flat leaf springs 64 are attached, as by rivets 65, to the inner surface of the hinge plate 53 at opposite sides of the projection aperture 55 and are adapted when this plate or gate 53 is in closed position to engage the rear surface of the pressure plate assembly 59 and urge the rear pressure plate 61 toward the front pressure plate 46. Thus, when a roll of strip film is positioned in the magazine 33 and its free end passes downwardly between the transparent pressure plates 48 and 61 this end will be normally held flat and immovable therebetween by the spring pressure being asserted.

Gate moving means is provided for separating the pressure plates 48 and 61 when desired so that the film may be easily inserted therebetween and also so that the film may be moved frame by frame without injury to the surfaces of the film. The gate moving means comprises a substantially U-shaped lever 66 (Fig. 2) the upwardly extending arms of which are pivotally mounted on the fixed shaft 50. The extreme upper ends of the arms of the lever 66 are turned inwardly as indicated at 67 and engage the respective ends of a pair of pins 68 which are securely carried by side flanges 69 (Fig. 4) of the frame member 60 of the pressure plate assembly 59. The pins 68 extend forwardly from the flanges of frame member 60 and pass through openings 70 provided therefor in the front plate 42. The ends of the pins 68 extend slightly beyond or forwardly of the front plate 42 and engage the angled end portions 67 of the lever 66, the springs 64 normally tending, due to their inherent resiliency, to move the upper ends of the arms of the lever 66 forwardly about the axis of the shaft 50.

The lower end of the U-shaped lever 66 has fixedly attached thereto an operating arm 71 which has a free end portion 71a thereof angled downwardly to engage one side of a square-sectioned sleeve or cam 72 rotatably mounted on one end of a shaft 73 extending horizontally beneath the strip film framing means. The end 71a of the arm 71 is held against the cam 72 by action of the springs 64 as described above. The shaft 73 is rotatably supported adjacent its opposite ends in angled side plate portions 74 (Figs. 4 and 5) of a transversely extending supporting bracket 75 and these side plate portions 74 are fixedly attached at 74' by welding or the like to the lower outwardly bent ends 49' of the side plates 49. As stated, the cam 72 is rotatable on shaft 73 and has an annular hub portion 76 thereof extending through the adjacent angled side plate portion 74 for detachably receiving a film moving knob 77 thereon.

By manual rotation of the knob 77 the cam 72 may be rotated in the side plate portion 74 and about the shaft 73 to cause the square-sectioned cam surface thereon to force the lower free end 71a of the arm 71 outwardly and cause pivotal movement of the operating lever 66 about shaft 50. This action in turn will cause the upper ends 67 of the lever 66 to force the pins 68 on frame 60 (see Fig. 3) rearwardly and consequently move the pressure plate assembly 59 and rear pressure plate 61, in opposition to the inherent tension of springs 64, in a direction away from the front pressure plate 48. With the pressure plates thus spaced apart, strip film can be freely moved in a vertical direction between the transparent members 48 and 61 without danger of scratching or injuring same.

The shaft 73 is provided substantially centrally thereof with a spool-like member 78 which has adjacent opposite ends thereof sprockets 79 provided with teeth 80 which are adapted to engage perforations in the edges of conventional strip film. The spool-like member 78 is attached for rotation with the shaft 73 by means of a key 81 threaded into the member 78 so that an end portion thereof slidably engages a longitudinally extending keyway 82 in the shaft. The square-sectioned cam 72 is provided with an angled finger 83 extending from one side thereof so as to be positioned within a notch 84 (Figs. 5 and 6) formed in a disc-like portion 85 integrally attached to one end of a square-sectioned hub 86 rotatably carried upon shaft 73 and this hub 86 carries at its other end a second disc-like portion 87. The disc-like portion 87 is adapted to engage one side surface of a friction disc 88 formed of resilient material such as rubber, plastic, fiber or the like, the friction disc 88 being secured to the adjacent end of the spool-like member 78 for rotation therewith. A collar 89 is fixedly mounted on the shaft 73 between the cam 72 and disc-like portion 85 and serves to prevent axial movement of the hub 86 toward the sleeve 72. A dished spring washer 90 is mounted on the shaft 73 adjacent the opposite end of the member 78 and is adapted to be held in pressing engagement against the member 78 by a collar 91 which is fixedly held in a position on the shaft 73 by a threaded key 92. The spring 90 constantly urges the member 78 toward the hub 86 and maintains the parts 87 and 88 in constant frictional engagement. Rotational movement of cam 72 by manual operation of knob 77 will, through finger 83, notch 84 and disc-like portion 85, consequently cause rotation of the member 78 due to frictional engagement of the parts. Thus, strip film which is located between the transparent pressure plates 48 and 61 and engaged by the teeth 80 of the sprocket wheels 79 may be pulled downwardly thereby when rotation of the sprocket wheels 79 as viewed in Fig. 3 is in a clockwise direction.

It is desirable, however, that the pressure plates 48 and 61 be spaced apart prior to any such movement of the strip film. To accomplish this initial spacing of the plates, the notch 84 in disc-like portion 85 is provided with a peripheral dimension slightly larger than the width of the angled finger 83. Thus, it will be apparent that sufficient limited rotary movement of the knob 77, cam 72 and angled finger 83 may be permitted, to cause a squared section on cam 72 to move the arm 71 and lever 66, consequently spacing of the pressure plates 48 and 61, before engagement of the angled finger 83 with either side of the notch 84. It will be appreciated that continued or further rotation of the cam 72 by knob 77 after this lost motion is taken up will subsequently cause the angled finger 83, engaging the side of the notch, to rotate the sprockets 79 and move the film accordingly. This initial gate opening action will take place regardless of which direction the knob 77 is rotated in.

To insure proper alignment of the picture areas of predetermined equal spacing upon the film with the aligned projection apertures in the framing device, the supporting bracket 75 is provided with yieldable centering means arranged to cooperate with the above described film moving means. This film centering means has a plate 93 (see Fig. 6) secured to bracket 75 as by rivets 75a or the like. The upper and lower edges of the plate 93 are angled outwardly slightly in a direction away from the bracket 75 and a pair of movable spring members 104 having angled end portions resting upon the angled edges of the plate 93 and positioned so as to extend toward the square-sectioned hub 86 and engage two opposed surfaces thereof. A bolt 105 extends through openings in the spring members and a nut 106 threaded onto the lower end of the bolt serves to retain a coiled spring 107 thereon compressed between the nut 106 and the adjacent spring member 104. The nut 106 may be adjusted to provide the tension desired in spring 107. Thus, if the hub 86 is rotated from the positon shown in Fig. 6 by the finger 83, the coiled spring 107 and spring members 104 will function first to yieldably oppose rotation of the squared hub 86 and after the high point on the hub has been passed these parts will tend to urge the hub toward its next rest position. Also if the knob 77 is released at any time by the operator of the projector the hub 86 will automatically move to its nearest centered position wherein two opposed side surfaces of the cam will be located parallel to and in engagement with the spring members 104. This assures that after the strip film has been initially correctly located in the projector successive picture areas of the film will be automatically positioned in substantial alignment with the projection apertures 46, 55 in the framing device as the film is advanced frame by frame.

When inserting a film in a strip film handling device of this character, knob 77 is initially moved slightly to open the pressure plates 48 and 61 and at this time the leading end of the strip film may be inserted from the top into the narrow space between the pressure plates and pushed downwardly until the end of the film engages the teeth 80 of the sprockets 79. A guide plate 100 is attached as by rivets 101 to a cross member 102 (Fig. 3) which has its end integral with side plates 49 and is connected at its lower end 103 to the transverse portion of the supporting bracket 75. This guide plate 100 extends downwardly and forwardly, is recessed on its opposite side edges sufficiently to fit between the spaced sprockets 79 at the forward side of the sprocket wheel and is provided with a looped lower end portion 100a. This guide plate 100 functions in three different ways. It serves to direct the leading end of the film in a corresponding direction, and also serves the purpose of insuring that the strip film being drawn downwardly by rotation of the sprocket will free itself from the sprocket teeth 80 thereafter; for otherwise the film might fail to disengage in a desired manner and might become injured. The extension 42a (see Fig. 2) of the front plate 42, it will be noted, is centrally recessed slightly so as to be spaced from the picture portions of the strip film and thus forms side guide rail portions which are lightly engaged by the looped portion 100a. Together the side rails and looped portion 100a function to hold the opposite edge portions of the film stationary except when moved by operation of the controls. Elongated slots 42b in the extension 42a are provided for the travel of the sprocket teeth 80.

After feeding of the film downwardly to cause the perforations in the longitudinal edges of the film to be engaged by the teeth 80 on the sprockets 79, continued rotation of knob 77 will cause the sprockets 79 to pull the film downwardly while the pressure plates remain in spaced relation. Knob 77 is operated until a picture area is positioned in the projection apertures of the device. Usually, however, the initial picture area will not be correctly framed. This might be due, for example, to the fact that the first picture areas on different films might be at different distances from the forward edge of the film and thus not centered by the "snap over" action of the springs 104 acting upon the square-sectioned hub 86. Or the fact that picture areas on different makes of films may not always be disposed in the same predetermined relation with reference to the sprocket perforations at the edges of the film may require a different initial centering by the operator.

Means is therefore provided to adjust the film to provide accurate framing of picture areas. For this purpose the disc 85 is provided with a number of equally spaced projections 111 (Figs. 3 and 6) on the periphery thereof. These projections as shown are aligned with the flat sides of the square-sided cam 72. The supporting bracket 75 is provided with an underlying forwardly extending portion 112 which carry a pair of transversely aligned headed pins 113. The pins 113 extend downwardly through an elongated slot in a latch 114. The latch 114 is arranged to slide transversely and has an intermediate portion which extends through a slot in the portion 112 (see Fig. 5) of the bracket 75 so that the bifurcated inner end of the latch 115 may be angled into parallel relation with the major portion of the latch for engaging on opposite sides of the lowermost projection 111 on the disc 85. Thus the disc 85 may be easily located and rendered immovable by sliding the latch horizontally into engagement therewith. The actuating end of latch 114 obviously could be arranged to extend to near either side plate 74 and thus located so as to be convenient for operation from either side of the projector as desired. To open the pressure plates 48 and 61 at this time, it is merely necessary to rotate the knob 77 slightly to take up the "play" between the finger 83 and side of notch 84, which action also moves the arm 71 outwardly slightly.

With the disc 85 locked in places by the latch 114 and the pressure plates held open by the knob 77, a knob 94 (Fig. 2) which is attached to the opposed end of the shaft 73 can be manually operated to rotate the shaft 73. By applying sufficient force on the knob 94 to overcome the frictional resistance between discs 87 and 88, slippage therebetween will occur and this will allow the sprockets 79 to be relocated without rotation of squared hub 86. The rotation of knob 94 will cause the film to be moved downwardly between the open pressure plates and accordingly align a particular picture area with the apertures of the device. After proper alignment of the film is once accomplished and the latch 114 disengaged from disc 85, it is only necessary to rotate the knob 77 to automatically align successive picture areas of the film in the framing means.

Although the projection apertures 46 and 62 in the plates 42 and 60 are of a predetermined size in accordance with the size of the picture areas of certain standard films, it is sometimes desirable to use a film having picture areas of smaller size, for example "half size" pictures. Therefore, to reduce the aperture size of the projector, the plate 60 (see Fig. 4) is provided immediately above and below the aperture 62 with slidable plates 95a and 95b. These plates are guided vertically between side rails 96. The leaf springs 97 and 98 are carried by frame 60 adjacent the upper and lower ends thereof and are adapted to yieldably engage the outer surfaces of the respective plates 95a and 95b and retain them in adjusted positions. To change the aperture size of the projector, the operator will merely slide the plates 95a and 95b in opposite directions toward or away from one another until their adjacent inner ends engage shoulders 99 formed by edge portions of the side rails or their recessed outer edges engage against the leaf springs. The plates are shown in Fig. 4 in their outermost positions. The shoulders 99 are so spaced from each other as to control the minimum size aperture which will result.

Although the film frame locating means shown in Figs. 5 and 6 has been described as embodying separate spring members 104, a bolt 105 and a coiled spring 107, this means could be satisfactorily replaced by a one-piece substantially U-shaped spring member 108, as shown in Fig. 7. In Fig. 7 there is shown a base portion 109 of the spring 108 secured to the supporting bracket 75 and arm portions 110 thereof extend toward the hub 86 to yieldably engage opposed side surfaces thereof. The U-shaped spring 108 due to the inherent resiliency of its pair of arms will function in a manner similar to the device shown in Fig. 6. Of course, if desired, these resilient arms could be made longer for more uniform flexing by arranging their points of attachment to the support at a greater distance from shaft 73.

Referring particularly to Fig. 8, it will be seen there is illustrated a modification in the means of advancing and framing picture areas in the projection apparatus. A longer shaft 73B in this instance is arranged to extend entirely through the removable unit and is provided on both ends thereof with similar knobs 116, either of which may be rotated to rotate the shaft 73 when centering or accurately aligning a picture area in the framing device is being effected. To open the pressure plates and advance the film, there is provided a knob 117 which is located in encircling relation with one of the knobs 116 and keyed by a set screw 118 to a cylindrical member 119 encircling shaft 73B. The cylindrical member has formed integrally therewith on its inner end, the square-sectioned cam 72B and a short finger 83B. The cylindrical member 119 is freely rotatable upon shaft 73B. Thus rotation of the knob 117 will, through rotation of cylindrical member 119, cam 72B and finger 83B cause rotary movement of the disc 85 to open the pressure plates as described here before. The shaft 73B, in this construction, is rotatable upon rotation of either knob 116 and independently of knob 117. Thus in this modified construction centering of an individual film frame can be accomplished by a control at either side of the instrument. Other parts of the device illustrated in Fig. 8 and their functions are similar to those provided in the previously described embodiment of this invention.

While in the foregoing description of the invention the projection of both transparent slides and strip film has been discussed, it should be noted here that a projector embodying features of the invention could be arranged to accommodate strip film only if desired.

From the foregoing description it will be apparent that improved projection apparatus has been provided whereby all of the objects and advantages of the invention have been accomplished. However, it is apparent that many changes may be made in the arrangement of parts shown and described without departing from the spirit of the invention. Therefore, it is to be understood that all material shown or described should be interpreted as illustrative and not in a limiting sense.

We claim:

1. In projection apparatus of the character described, a housing, an optical system carried by said housing and establishing a projection axis, a film positioning and advancing unit carried by said housing, said unit comprising a pair of pressure plates located in adjacent relation adjacent a focal plane upon said projection axis, resilient means yieldably retaining said pressure plates in engagement with each other so as to confine said strip film when located therebetween substantially at said focal plane, lever means operatively associated with one of said pressure plates, cam means operatively engaging said lever means for operating same to space said pressure plates relative to each other and permit said strip film to be moved freely therebetween, a rotatable support for supporting said cam means adjacent said lever means, control means for rotating said cam means, sprocket means on said support for engagement with said strip film and rotatable to move said strip film between said pressure plates, lost motion clutch means on said support operatively connected with said sprocket means and with said cam means for effecting movement of said sprocket means to move the film strip only after said cam means has rotated a limited amount and resultant spacing of said pressure plates has occurred, indexing means operatively associated with said sprocket means for yieldably retaining said sprocket means in any one of a plurality of positions of rotation relative to said rotatable support, friction means for preventing undesired rotation between said sprocket means and said indexing means, and readily releasable means for holding said indexing means from rotating while said sprocket means is being rotated relative thereto for adjusting the projection position of an individual film frame relative to said projection axis.

2. In projection apparatus of the character described, a housing, an optical system carried by said housing and establishing a projection axis, a film positioning and advancing unit carried by said housing, said unit comprising a pair of pressure plates located in adjacent relation adjacent a focal plane upon said projection axis, resilient means yieldably retaining said pressure plates in engagement with each other so as to confine said strip film when located therebetween substantially at said focal plane, lever means operatively associated with one of said pressure plates, cam means operatively engaging said lever means for operating same to space said pressure plates relative to each other and permit said strip film to be moved freely therebetween, a rotatable support for supporting said cam means adjacent said lever means, control means for rotating said cam means, sprocket means fixedly secured to said support for engagement with said strip film and rotatable to move said strip film between said pressure plates, lost motion clutch means on said support operatively connected with said sprocket means and with said cam means for effecting movement of said sprocket means to move the film strip only after said cam means has rotated a limited amount and resultant spacing of said pressure plates has occurred, indexing means operatively associated with said sprocket means for yieldably retaining said sprocket means in any one of a plurality of positions of rotation relative to said rotatable support for automatically positioning successive frames on said strip film being moved between said pressure plates into projection positions relative to said projection axis, friction means for preventing undesired relative rotation between said sprocket means and said indexing means, and a second control for actuating said rotatable support, whereby rotation of one of said controls relative to the other of said controls will produce adjustment of said sprocket means relative to said indexing means for altering the projection position of a film frame relative to said projection axis.

3. In projection apparatus of the character described, a housing, an optical system carried by said housing and establishing a projection axis, a film positioning and advancing unit carried by said housing, said unit comprising a pair of pressure plates located in adjacent relation adjacent a focal plane upon said projection axis, resilient means yieldably retaining said pressure plates in engagement with each other so as to confine said strip film when located therebetween substantially at said focal plane, lever means operatively associated with one of said pressure plates, cam means operatively engaging said lever means for operating same to space said pressure plates relative to each other and permit said strip film to be moved freely therebetween, a rotatable support for supporting said cam means adjacent said lever means, control means positioned adjacent one side of said housing for rotating said cam means, sprocket means fixedly secured to said support for engagement with said strip film and rotatable to move said strip film between said pressure plates, lost motion clutch means on said support operatively connected with said sprocket means and with said cam means for effecting movement of said sprocket means to move the film strip only after said cam means has rotated a limited amount and resultant spacing of said pressure plates has occurred, indexing means operatively associated with said sprocket means for yieldably retaining said sprocket means in any one of a plurality of positions of rotation relative to said rotatable support for automatically positioning successive frames on said strip film being moved between said pressure plates into projection positions relative to said projection axis, friction means for preventing undesired relative rotation between said sprocket means and said indexing means, and a second control on said rotatable support and adjacent the other side of said housing, whereby rotation of one of said controls relative to the other of said controls will produce adjustment of said sprocket means relative to said indexing means for altering the projection position of a film frame relative to said projection axis.

4. In projection apparatus of the character described, a housing, an optical system carried by said housing and establishing a projection axis, a film positioning and advancing unit carried by said housing for supporting said strip film in a focal plane of said optical system and for advancing said strip film relative to said projection axis, said unit being bodily removable from said housing and comprising a first apertured transverse plate-like member interconnecting a pair of side members to form a main frame, a second apertured transverse plate-like member hingedly connected at its opposite sides to said side members so as to allow relative swinging movement of said plate-like members when said unit is removed from said housing, a pair of pressure plates arranged in adjacent relation to each other and disposed between said plate-like members, one of said pressure plates being fixedly carried by said first plate-like member and the other pressure plate being movable relative thereto, resilient means carried by said second plate-like member and yieldably engaging said movable pressure plate for maintaining said pressure plates in engagement with each other so as to confine said strip film when located therebetween substantially at said focal plane, lever means on said main frame operatively associated with said movable pressure plate, cam means operatively engaging said lever means for actuating same to space said pressure plates relative to each other, to thereby permit said strip film to be moved freely therebetween, a rotatable support on said main frame rotatably supporting said cam means adjacent said lever means, a control for rotating said cam means, sprocket means on said rotatable support for engagement with said film strip and rotatable to move said strip film relative to said pressure plates, and lost motion clutch means on said support operatively connected with said sprocket means and with said cam means for effecting movement of said sprocket means to advance the strip film only after said cam means has been rotated a limited amount and resultant spacing of said pressure plates has occurred.

5. In projection apparatus of the character described, a housing, an optical system carried by said housing and establishing a projection axis, a film positioning and advancing unit carried by said housing for supporting said strip film in a focal plane of said optical system and for advancing said strip film relative to said projection axis, said unit being bodily removable from said housing and comprising a first apertured transverse plate-like member interconnecting a pair of side members to form a main frame, a second apertured transverse plate-like member hingedly connected at its opposite sides to said side members so as to allow relative swinging movement of said plate-like members when said unit is removed from said housing, a pair of pressure plates arranged in adjacent relation to each other and disposed between said plate-like members, one of said pressure plates being fixedly carried by said first plate-like member and the other pressure plate being movable relative thereto, resilient means carried by said second plate-like member and yieldably engaging said movable pressure plate for maintaining said pressure plates in engagement with each other so as to confine said strip film when located therebetween substantially at said focal plane, lever means on said main frame operatively associated with said movable pressure plate, cam means operatively engaging said lever means for actuating same to space said pressure plates relative to each other, to thereby permit said strip film to be moved freely therebetween, a rotatable support on said main frame rotatably supporting said cam means adjacent said lever means, a control for rotating said cam means, sprocket means on said rotatable support for engagement with said film strip and rotatable to move said strip film relative to said pressure plates, lost motion clutch means on said support operatively connected with said sprocket means and with said cam means for effecting movement of said sprocket means to advance the strip film only after said cam means has been rotated a limited amount and resultant spacing of said pressure plates has occurred, and means associated with said pressure plates and accessible when said unit is removed from said housing and forming a projection aperture of adjustable size in accordance with the size of film frame to be projected by the apparatus.

6. In projection apparatus of the character described having means establishing a projection beam, a mechanism for supporting strip film substantially at a predetermined focal plane in said projection beam and for advancing said strip film relative thereto, said mechanism comprising a main frame, a secondary frame connected thereto, a pair of pressure plates for receiving strip film therebetween, said pressure plates being carried by said main frame and said secondary frame respectively and located in said projection beam and in adjacent aligned relation to each other with the adjacent surfaces thereon disposed closely adjacent said focal plane, spring means on said secondary frame normally yieldably urging one of said pressure plates toward the other so as to prevent any substantial movement of portions of the strip film in said projection beam away from said focal plane, lever means pivotally carried by said main frame and operatively connected to said one spring-urged pressure plate, cam means rotatably carried in an opening in a side plate portion of said main frame so as to rotate about a predetermined axis of rotation while operatively engaging said lever for moving said one pressure plate away from the other, thereby permitting said strip film to be moved freely between said pressure plates, a shaft concentric with said rotatable cam means, and rotatably supported by said cam means and by a second opening in a side plate portion of said main frame so as to rotate about said axis, a manual control for rotating said cam means, a sprocket secured to said shaft so as to rotate therewith and arranged to engage a part of said strip film extending outwardly of said pressure plates and rotatable to advance the portion of said strip film located between said pressure plates, a lost motion clutch element rotatably carried on said shaft and having a part loosely operatively engageable by a fixed arm on said cam means for effecting rotary movement of said sprocket to advance said strip film only after said cam means has been rotated a predetermined limited amount by said control means to take up said lost motion and simultaneous spacing of said pressure plates by said lever means has occurred, said clutch element having a plurality of indexing surfaces thereon, an indexing spring carried on said main frame and engageable with any one of said indexing surfaces for releasably holding said clutch element and sprocket in any one of a plurality of different operative positions, and means on said shaft between said clutch element and said sprocket for allowing relative rotational movement of said sprocket and shaft relative to said clutch element when said shaft is rotated manually a sufficient amount relative to said manual control to thereby effect proper framing of the film in said projection beam.

7. In projection apparatus of the character described, a housing, an optical system carried by said housing and establishing a projection beam, a mechanism for supporting strip film substantially at a predetermined focal plane in said projection beam and for advancing strip film relative thereto, said mechanism being bodily removable from said housing and comprising a main frame, a removable secondary frame positioned adjacent thereto, a pair of pressure plates for receiving strip film therebetween carried by said main frame and said secondary frame respectively and located in adjacent aligned relation to each other in said projection beam, one of said plates being fixed relative to said main frame and the other being secured to said secondary frame, a movable gate pivotally connected to said main frame so as to swing from an open position to a closed position enclosing said secondary frame and associated pressure plate between said gate and said main frame, spring means carried by said gate and normally yieldably urging said secondary frame and pressure plate carried thereby toward the pressure plate fixed to said main frame, to thereby prevent any substantial movement of portions of said strip film in said projection beam from moving away from a predetermined focal plane of said projection apparatus, lever means pivotally carried by said main frame and operatively engaging parts carried by said secondary frame for moving said spring-urged pressure plate away from the fixed pressure plate on the main frame, cam means rotatably carried in an opening in said main frame so as to rotate about a predetermined axis of rotation while operatively engaging said lever means for moving said movable pressure plate to permit said strip film to be moved freely between said pressures, a rotatable shaft concentric with said cam means and rotatably supported by said cam means and by said main frame so as to rotate about said axis, manual control means for rotating said cam means, a sprocket secured to said rotatable shaft for rotation therewith and arranged to engage a part of said strip film extending outwardly from said pressure plates, and rotatable to advance said strip film between said pressure plates, lost motion clutch means rotatably mounted on said shaft and having a part operatively connected to said sprocket means and a part operatively connected to said cam means for effecting rotary motion for said sprocket to advance said strip film only after said cam means has been rotated a predetermined limited amount to take up the lost motion in said clutch means and simultaneous spacing of said pressure plates has occurred, said lost motion clutch having a plurality of indexing surfaces thereon, an indexing spring carried on said main frame for engaging any one of said indexing surfaces for retaining said sprocket in different positions of adjustment, and friction means on said shaft between said clutch element and said sprocket for allowing rotational movement of said sprocket and shaft relative to said clutch element when said shaft is rotated manually a sufficient amount relative to said manual control to thereby effect proper framing of the film in said projection beam, the movable pressure plate and secondary frame associated therewith being readily removable from said mechanism when said mechanism is removed from said projector and said pivoted gate is swung to its open position.

References Cited in the file of this patent

UNITED STATES PATENTS

| | | |
|---|---|---|
| 1,679,399 | Brewster | Aug. 7, 1928 |
| 1,704,814 | Wellman | Mar. 12, 1929 |
| 1,738,762 | De Vault | Dec. 10, 1929 |
| 2,126,474 | Kleerup | Aug. 9, 1938 |
| 2,231,765 | Landrock | Feb. 11, 1941 |
| 2,330,709 | Harper et al. | Sept. 28, 1943 |
| 2,374,768 | Monk et al. | May 1, 1945 |
| 2,407,339 | Lebus | Sept. 10, 1946 |
| 2,595,978 | Perillo et al. | May 6, 1952 |
| 2,724,990 | Bennett | Nov. 29, 1955 |

FOREIGN PATENTS

| | | |
|---|---|---|
| 598,483 | Great Britain | Feb. 19, 1948 |
| 681,262 | Great Britain | Oct. 22, 1952 |